(12) United States Patent
Xu

(10) Patent No.: US 10,298,970 B2
(45) Date of Patent: May 21, 2019

(54) IMAGE TRANSMISSION METHOD AND APPARATUS

(71) Applicant: Huawei Technologies Co., Ltd., Shenzhen (CN)

(72) Inventor: Licheng Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 234 days.

(21) Appl. No.: 15/464,662

(22) Filed: Mar. 21, 2017

(65) Prior Publication Data

US 2017/0195699 A1    Jul. 6, 2017

Related U.S. Application Data

(63) Continuation of application No. PCT/CN2015/096508, filed on Dec. 6, 2015.

(30) Foreign Application Priority Data

Dec. 12, 2014  (CN) .......................... 2014 1 0767393

(51) Int. Cl.
*H04N 21/2343* (2011.01)
*H04L 29/06* (2006.01)
(Continued)

(52) U.S. Cl.
CPC ..... *H04N 21/234327* (2013.01); *G06F 9/452* (2018.02); *H04L 65/1069* (2013.01);
(Continued)

(58) Field of Classification Search
CPC ............................................. H04N 21/234327
(Continued)

(56) References Cited

U.S. PATENT DOCUMENTS 7,181,223 B1   2/2007  Pecen et al.
7,672,005 B1   3/2010  Hobbs et al.
(Continued)

FOREIGN PATENT DOCUMENTS

CN   1437800 A   8/2003
CN   1812313 A   8/2006
(Continued)

OTHER PUBLICATIONS

Machine Translation and Abstract of Chinese Publication No. CN1812313, Aug. 2, 2006, 13 pages.
(Continued)

*Primary Examiner* — Ondrej C Vostal
(74) *Attorney, Agent, or Firm* — Conley Rose, P.C.

(57) ABSTRACT

An image transmission method and an apparatus are provided. The image transmission method is applied to a system in which a client device establishes a remote desktop connection to a server and includes dividing an image according to at least two pixel scales, to obtain multiple image blocks in each pixel scale, determining a hash value of each image block in each pixel scale, querying a cache according to the hash value of each image block in each pixel scale, setting a sending flag bit of each image block in each pixel scale according to a query result, and sending, according to the sending flag bit of each image block in each pixel scale, information about the image block to the client device using the remote desktop connection in order to reduce redundant data with lower computation complexity and space complexity and reduce a requirement for bandwidth.

12 Claims, 4 Drawing Sheets

(51) Int. Cl.
 *H04L 29/08* (2006.01)
 *H04N 19/426* (2014.01)
 *G06F 9/451* (2018.01)
(52) U.S. Cl.
 CPC .......... *H04L 67/2842* (2013.01); *H04L 67/42* (2013.01); *H04N 19/428* (2014.11)
(58) Field of Classification Search
 USPC ........................................................ 709/203
 See application file for complete search history.

(56) References Cited

U.S. PATENT DOCUMENTS

| | | | |
|---|---|---|---|
| 8,345,768 B1* | 1/2013 | Hobbs | G06T 9/00 375/240.24 |
| 2004/0131115 A1 | 7/2004 | Burgess et al. | |
| 2004/0223656 A1* | 11/2004 | Moreira | H04B 1/665 382/240 |
| 2008/0304751 A1* | 12/2008 | Hayasaki | G06K 9/3216 382/195 |
| 2010/0146139 A1* | 6/2010 | Brockmann | H04N 21/234318 709/231 |
| 2010/0293248 A1 | 11/2010 | Kamay et al. | |
| 2012/0250984 A1* | 10/2012 | Taylor | G06K 9/00771 382/162 |
| 2014/0092963 A1* | 4/2014 | Wang | H04N 19/50 375/240.12 |
| 2014/0152760 A1* | 6/2014 | Granstrom | G06K 9/00 348/14.08 |
| 2014/0321553 A1 | 10/2014 | Clark | |

FOREIGN PATENT DOCUMENTS

| | | |
|---|---|---|
| CN | 101014127 A | 8/2007 |
| CN | 101583026 A | 11/2009 |
| CN | 102821278 A | 12/2012 |
| CN | 103281538 A | 9/2013 |
| CN | 103402089 A | 11/2013 |
| CN | 104469395 A | 3/2015 |

OTHER PUBLICATIONS

Machine Translation and Abstract of Chinese Publication No. CN101014127, Aug. 8, 2007, 20 pages.
Machine Translation and Abstract of Chinese Publication No. CN101583026, Nov. 18, 2009, 11 pages.
Machine Translation and Abstract of Chinese Publication No. CN102821278, Dec. 12, 2012, 23 pages.
Machine Translation and Abstract of Chinese Publication No. CN103281538, Sep. 4, 2013, 12 pages.
Machine Translation and Abstract of Chinese Publication No. CN103402089, Nov. 20, 2013, 10 pages.
Machine Translation and Abstract of Chinese Publication No. CN104469395, Mar. 25, 2015, 9 pages.
"Series H: Audiovisual and Multimedia Systems, Infrastructure of audiovisual services—Coding of moving video, Advanced video coding for generic audiovisual services," ITU-T, H.264, Feb. 2014, 790 pages.
"Series H: Audiovisual and Multimedia Systems, Infrastructure of audiovisual services—Coding of moving video, High efficiency video coding," ITU-T, H.265, Oct. 2014, 540 pages.
Foreign Communication From a Counterpart Application, Chinese Application No. 201410767393.9, Chinese Office Action dated Apr. 5, 2017, 7 pages.
Foreign Communication From a Counterpart Application, PCT Application No. PCT/CN2015/096508, English Translation of International Search Report dated Mar. 11, 2016, 2 pages.
Foreign Communication From a Counterpart Application, PCT Application No. PCT/CN2015/096508, English Translation of Written Opinion dated Mar. 11, 2016, 6 pages.
Foreign Communication From a Counterpart Application, European Application No. 15868020.7, Extended European Search Report dated Oct. 23, 2017, 8 pages.

* cited by examiner

IMAGE TRANSMISSION METHOD AND APPARATUS

CROSS-REFERENCE TO RELATED APPLICATIONS

This application is a continuation of International Patent Application No. PCT/CN2015/096508 filed on Dec. 6, 2015, which claims priority to Chinese Patent Application No. 201410767393.9 filed on Dec. 12, 2014. The disclosures of the aforementioned applications are hereby incorporated by reference in their entireties.

TECHNICAL FIELD

Embodiments of the present disclosure relate to communications technologies, and in particular, to an image transmission method and an apparatus.

BACKGROUND

Virtual desktop cloud (VDC) refers to an application that enables a user to access a remote desktop across platforms using a client or any other device connected to a network, like using a local personal computer. A desktop operating system and an application environment of the VDC are centrally deployed on a remote serving end. Locally there is only a low-performance client or a display device, which is connected to the serving end using a network, thereby providing the user with operation experience like using a personal computer (PC). The VDC changes a past distributed independent desktop system environment, integrating resources and making the resources easy to manage.

Screen content coding (SCC) mainly focuses on highly efficient compression and transmission of a virtual desktop and is a hybrid compression algorithm based on image blocking.

However, according to this method, a larger amount of redundant data and high computation complexity and space complexity are caused, and higher network bandwidth is required to meet a user's requirement for the virtual desktop.

SUMMARY

Embodiments of the present disclosure provide an image transmission method and an apparatus in order to reduce redundant data, computation complexity, and space complexity, and reduce a requirement for bandwidth.

According to a first aspect, an embodiment of the present disclosure provides an image transmission method, where the method is applied to a system in which a client device establishes a remote desktop connection to a server, and includes dividing an image according to at least two pixel scales, to obtain multiple image blocks in each pixel scale, determining a hash value of each image block in each pixel scale, querying a cache according to the hash value of each image block in each pixel scale, and setting a sending flag bit of each image block in each pixel scale according to a query result, and sending, according to the sending flag bit of each image block in each pixel scale, information about the image block to the client device using the remote desktop connection.

With reference to the first aspect, in a first possible implementation manner of the first aspect, setting a sending flag bit of each image block in each pixel scale according to a query result includes setting a sending flag bit of the first image block to sending not allowed if a hash value of a first image block in each pixel scale is found in the cache, and a status, in the cache, corresponding to the hash value of the first image block is sent, identifying, in the cache, the status corresponding to the hash value of the second image block as sent, and setting a sending flag bit of the second image block to sending allowed if a hash value of a second image block in each pixel scale is found in the cache, and a status, in the cache, corresponding to the hash value of the second image block is unsent, saving the hash value of the third image block in the cache, identifying, in the cache, a status corresponding to the hash value of the third image block as unsent, and setting a sending flag bit of the third image block to sending not allowed if a hash value of a third image block in each pixel scale is not found in the cache, and a pixel scale of the third image block is not a minimum pixel scale of the at least two pixel scales, and saving the hash value of the fourth image block in the cache, identifying, in the cache, a status corresponding to the hash value of the fourth image block as sent, and setting a sending flag bit of the fourth image block to sending allowed if a hash value of a fourth image block in each pixel scale is not found in the cache, and a pixel scale of the fourth image block is the minimum pixel scale of the at least two pixel scales.

With reference to the first aspect or the first possible implementation manner of the first aspect, in a second possible implementation manner of the first aspect, sending, according to the sending flag bit of each image block in each pixel scale, information about the image block to the client device using the remote desktop connection includes sending, to the client device using the remote desktop connection, information about an image block whose sending flag bit is sending allowed among the image blocks in each pixel scale.

With reference to any one of the first aspect, or the first or the second possible implementation manner of the first aspect, in a third possible implementation manner of the first aspect, querying a cache according to the hash value of each image block in each pixel scale includes the following steps.

Step a: Querying the cache according to a hash value of each image block in a maximum pixel scale of the at least two pixel scales, skipping dividing an image block, in the maximum pixel scale, whose corresponding hash value is found in the cache, performing the step of setting a sending flag bit according to a query result, and performing the following step b for an image block, in the maximum pixel scale, whose corresponding hash value is not found in the cache;

Step b: Obtaining an image block in a second pixel scale corresponding to the image block, in the maximum pixel scale, whose corresponding hash value is not found in the cache, querying the cache according to a hash value of each image block in the second pixel scale, skipping dividing an image block, in the second pixel scale, whose corresponding hash value is found in the cache, and performing the step of setting a sending flag bit according to a query result, and performing step c for an image block, in the second pixel scale, whose corresponding hash value is not found in the cache, where the second pixel scale is a pixel scale of the at least two pixel scales that is smaller than the maximum pixel scale; and Step c: Obtaining an image block in a third pixel scale corresponding to the image block, in the second pixel scale, whose corresponding hash value is not found in the cache, querying the cache according to a hash value of each image block in the third pixel scale, skipping dividing an image block, in the third pixel scale, whose corresponding hash value is found in the cache, and performing the step of setting a sending flag bit according to a query result, and continuing to divide an image block, in the third pixel scale, whose corresponding hash value is not found in the cache, where the third pixel scale is a pixel scale of the at least two pixel scales that is smaller than the second pixel scale.

According to a second aspect, an embodiment of the present disclosure provides a serving end apparatus, where the apparatus is applied to a system in which a client apparatus establishes a remote desktop connection to the serving end apparatus, and includes a hash determining module configured to divide an image according to at least two pixel scales, to obtain multiple image blocks in each pixel scale, and determine a hash value of each image block in each pixel scale, a query module configured to query a cache according to the hash value of each image block in each pixel scale, and set a sending flag bit of each image block in each pixel scale according to a query result, and a sending module configured to send, according to the sending flag bit of each image block in each pixel scale, information about the image block to the client apparatus using the remote desktop connection.

With reference to the second aspect, in a first possible implementation manner of the second aspect, the query module is further configured to set a sending flag bit of the first image block to sending not allowed if a hash value of a first image block in each pixel scale is found in the cache, and a status, in the cache, corresponding to the hash value of the first image block is sent, identify, in the cache, the status corresponding to the hash value of the second image block as sent, and set a sending flag bit of the second image block to sending allowed if a hash value of a second image block in each pixel scale is found in the cache, and a status, in the cache, corresponding to the hash value of the second image block is unsent, save the hash value of the third image block in the cache, identify, in the cache, a status corresponding to the hash value of the third image block as unsent, and set a sending flag bit of the third image block to sending not allowed if a hash value of a third image block in each pixel scale is not found in the cache, and a pixel scale of the third image block is not a minimum pixel scale of the at least two pixel scales, and save the hash value of the fourth image block in the cache, identify, in the cache, a status corresponding to the hash value of the fourth image block as sent, and set a sending flag bit of the fourth image block to sending allowed if a hash value of a fourth image block in each pixel scale is not found in the cache, and a pixel scale of the fourth image block is the minimum pixel scale of the at least two pixel scales.

With reference to the second aspect or the first possible implementation manner of the second aspect, in a second possible implementation manner of the second aspect, the sending module is further configured to send, to the client device using the remote desktop connection, information about an image block whose sending flag bit is sending allowed among the image blocks in each pixel scale.

With reference to any one of the second aspect, or the first or the second possible implementation manner of the second aspect, in a third possible implementation manner of the second aspect, the query module is further configured to perform the following steps.

Step a: Query the cache according to a hash value of each image block in a maximum pixel scale of the at least two pixel scales, skip dividing an image block, in the maximum pixel scale, whose corresponding hash value is found in the cache, and perform the step of setting a sending flag bit according to a query result, and perform the following step b for an image block, in the maximum pixel scale, whose corresponding hash value is not found in the cache;

Step b: Obtain an image block in a second pixel scale corresponding to the image block, in the maximum pixel scale, whose corresponding hash value is not found in the cache, query the cache according to a hash value of each image block in the second pixel scale, skip dividing an image block, in the second pixel scale, whose corresponding hash value is found in the cache, and perform the step of setting a sending flag bit according to a query result, and perform step c for an image block, in the second pixel scale, whose corresponding hash value is not found in the cache, where the second pixel scale is a pixel scale of the at least two pixel scales that is smaller than the maximum pixel scale; and Step c: Obtain an image block in a third pixel scale corresponding to the image block, in the second pixel scale, whose corresponding hash value is not found in the cache, query the cache according to a hash value of each image block in the third pixel scale, skip dividing an image block, in the third pixel scale, whose corresponding hash value is found in the cache, and perform the step of setting a sending flag bit according to a query result, and continue to divide an image block, in the third pixel scale, whose corresponding hash value is not found in the cache, where the third pixel scale is a pixel scale of the at least two pixel scales that is smaller than the second pixel scale.

According to the image transmission method and the apparatus in the embodiments of the present disclosure, an image is divided according to at least two pixel scales, a hash value of each image block in each pixel scale is determined, and the hash value of each image block and cached hash values are compared in a depth-first traversal manner from a maximum pixel scale to a minimum pixel scale. This implements repetition-free sending of similar image blocks in the image and resolves a problem that in a current image transmission method, a larger amount of redundant data and high computation complexity and space complexity are caused, and higher network bandwidth is required to meet a user's requirement for a virtual desktop.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
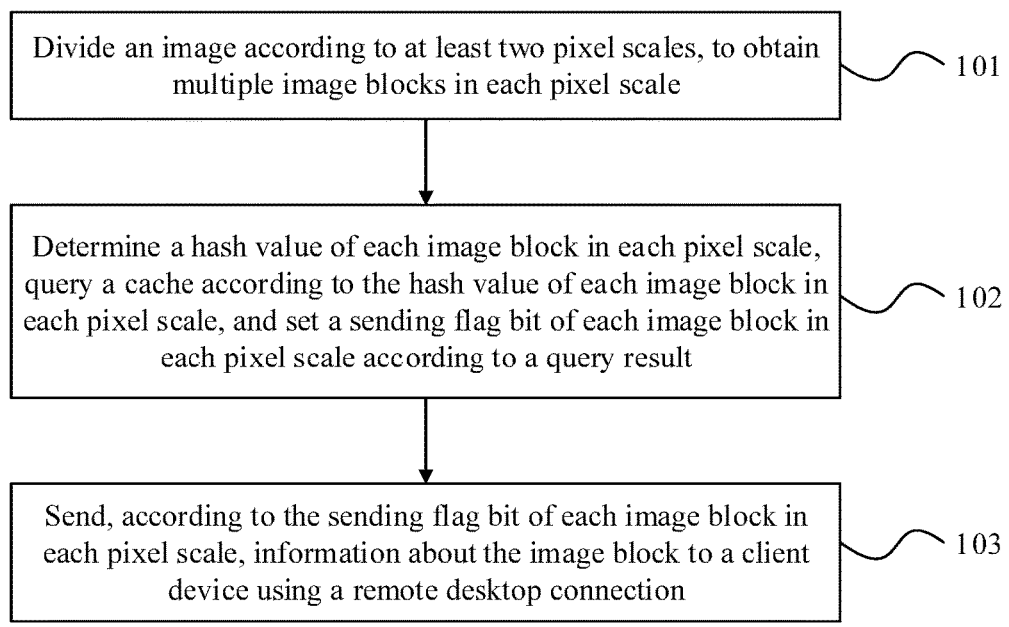
FIG. 1 is a flowchart of an embodiment of an image transmission method according to the present disclosure.

FIG. 1 is a flowchart of an embodiment of an image transmission method according to the present disclosure. As shown in FIG. 1, the method in this embodiment is applied to a system in which a client device establishes a remote desktop connection to a server. The method may include the following steps.

Step 101: Divide an image according to at least two pixel scales, to obtain multiple image blocks in each pixel scale.

The present disclosure may be performed by the server in the foregoing system. A desktop operating system and an application environment of VDC are deployed on the server. The server transmits, to the client device using the remote desktop connection, an image displayed on a desktop. A user may see, using a display screen of the client device, the desktop remotely transmitted by the server and obtain experience like using a local PC. Image transmission has a relatively high requirement for bandwidth. In order not to reduce image quality, the server needs to eliminate redundant image data as much as possible when transmitting an image in order to reduce a requirement for bandwidth. In the present disclosure, the server divides the image according to at least two pixel scales using an idea of hierarchical nesting. For example, there are a total of three pixel scales, with a minimum pixel scale (the third level) being 16×16, a medium pixel scale (the second level) being 32×32, and a maximum pixel scale (the first level) being 64×64. The image is divided according to the 16×16 pixel scale, to obtain multiple 16×16 image blocks. The image is divided according to the 32×32 pixel scale, to obtain multiple 32×32 image blocks. The image is divided according to the 64×64 pixel scale, to obtain multiple 64×64 image blocks. Alternatively, four 16×16 image blocks may constitute one 32×32 image block, and four 32×32 image blocks may constitute one 64×64 image block. In this way, for a one-frame image, there may be a three-level pixel scale division method.

Step 102: Determine a hash value of each image block in each pixel scale, query a cache according to the hash value of each image block in each pixel scale, and set a sending flag bit of each image block in each pixel scale according to a query result.

After dividing the image into multiple image blocks in the at least two pixel scales, the server determines the hash value of each image block in each pixel scale. For example, a hash value of each image block in the foregoing three pixel scales (16×16, 32×32, and 64×64) is determined. Calculation of the hash value may be, for example, sampling summation, modulo, or the like performed on a fixed point on each image block. This is not limited herein. After determining the hash value of each image block in each pixel scale, the server queries the cache according to these hash values. There are the following several cases for the hash value of each image block in each pixel scale. In one case, the hash value is saved in the cache, and the image block has been sent to the client device. In another case, the hash value is saved in the cache, and the image block has not been sent to the client device. In a third case, the hash value is not saved in the cache. An objective of querying the cache by the server is to determine whether an image block that is the same as a given image block of the image blocks in each pixel scale has been sent. Because of similarity between different blocks in inter-frame images or an intra-frame image, pixels of most blocks in images of consecutive frames change little, or pixels of different blocks in an intra-frame image change little. For these blocks with extremely great similarity, hash values obtained through calculation using a same hash algorithm are the same. Therefore, when a hash value same as a hash value of a given image block is found in the cache, the server may not send information about the image block. This avoids repeatedly sending information about a same image block to the client device, thereby reducing a requirement for bandwidth.

In the present disclosure, to decrease redundant data as much as possible and reduce computation complexity and space complexity, query starts from each image block in a maximum pixel scale that is obtained through division. For example, the maximum pixel scale is 64×64, and the cache is queried according to a hash value of each 64×64 image block. If a same hash value is found, it indicates that a similar image block has appeared, and information about this 64×64 image block may not be sent. If no same hash value for a 64×64 image block is found, it indicates that the 64×64 image block appears for the first time, and the 64×64 image block is divided according to a next-level pixel scale for further query. That is, the 64×64 image block is divided into four 32×32 image blocks for further matching, and the cache is queried according to hash values of the four 32×32 image blocks. Query is performed by analogy, until query is performed according to a 16×16 image block at a lowest-level.

In the present disclosure, an objective of starting query from the maximum pixel scale is that if a same hash value for an image block in the maximum pixel scale is found in the cache, the image block does not need to be further divided. Besides, all blocks of a one-frame image and cached hash values are compared in this depth-first traversal manner. This can decrease a to-be-matched block area level by level, thereby reducing redundant data, computation complexity, and space complexity.

The server may identify, by setting a sending flag bit for an image block, whether to send information about the image block to the client device. There are two cases for a value of the sending flag bit, sending allowed and sending not allowed. The server sends, to the client device, only information about an image block whose sending flag bit is sending allowed. This can avoid an image block from being repeatedly sent, thereby reducing a requirement for bandwidth.

Step 103: Send, according to the sending flag bit of each image block in each pixel scale, information about the image block to the client device using the remote desktop connection.

The server determines, according to the sending flag bit of each image block in each pixel scale, information about which image blocks need to be sent to the client device and information about which image blocks do not need to be sent to the client device. The client device in the present disclosure may be any terminal device that can be used for display. This is not limited herein.

In this embodiment, an image is divided according to at least two pixel scales, a hash value of each image block in each pixel scale is determined, and the hash value of each image block and cached hash values are compared in a depth-first traversal manner from a maximum pixel scale to a minimum pixel scale. This implements repetition-free sending of similar image blocks in the image and resolves a problem that in a current image transmission method, a larger amount of redundant data and high computation complexity and space complexity are caused, and higher network bandwidth is required to meet a user's requirement for a virtual desktop.

Further, a specific implementation method for the setting a sending flag bit of each image block in each pixel scale according to a query result in step 102 may include that a sending flag bit of the first image block is set to sending not allowed if a hash value of a first image block in each pixel scale is found in the cache, and a status, in the cache, corresponding to the hash value of the first image block is sent, if a hash value of a second image block in each pixel scale is found in the cache, and a status, in the cache, corresponding to the hash value of the second image block is unsent, the status corresponding to the hash value of the second image block is identified in the cache as sent, and a sending flag bit of the second image block is set to sending allowed, if a hash value of a third image block in each pixel scale is not found in the cache, and a pixel scale of the third image block is not a minimum pixel scale of the at least two pixel scales, the hash value of the third image block is saved in the cache, a status corresponding to the hash value of the third image block is identified in the cache as unsent, and a sending flag bit of the third image block is set to sending not allowed, and if a hash value of a fourth image block in each pixel scale is not found in the cache. and a pixel scale of the fourth image block is the minimum pixel scale of the at least two pixel scales, the hash value of the fourth image block is saved in the cache, a status corresponding to the hash value of the fourth image block is identified in the cache as sent, and a sending flag bit of the fourth image block is set to sending allowed.

Further, three factors need to be considered when the server sets a sending flag bit, a query result, a status corresponding to a hash value in the cache, and a value of a current sending flag bit. For an image block whose hash value is not found in the cache, the hash value of the image block may be first saved in the cache. This includes two cases. If the image block is an image block in the minimum pixel scale, the image block is the foregoing fourth image block, and information about the image block needs to be sent to the client device. Therefore, the status corresponding to the hash value of the fourth image block is identified in the cache as sent, and the sending flag bit of the fourth image block is set to sending allowed. If the image block is not an image block in the minimum pixel scale, the image block is the foregoing third image block and may be divided into image blocks in a smaller pixel scale. Therefore, information about the image block temporarily does not need to be sent. Instead, the hash value of the image block is first saved, and the status corresponding to the hash value of the third image block is identified as unsent. If a hash value that is the same as the hash value of the third image block appears subsequently, information about an image block that appears for the second time is sent. In this case, the sending flag bit of the third image block is set to sending not allowed. For an image block whose hash value is found in the cache, it depends on a status corresponding to the hash value in the cache. If the status is sent, the image block is the foregoing first image block, indicating that a same image block has appeared before, and the image block has been sent. Therefore, the first image block does not need to be repeatedly sent, and the sending flag bit of the first image block is set to sending not allowed. If the status corresponding to the hash value in the cache is unsent, the image block is the foregoing second image block, indicating that although the hash value is in the cache, a same image block is not sent. Therefore, the sending flag bit of the second image block is set to sending allowed.

The image blocks in the present disclosure are in a hierarchical nesting structure, that is, image blocks in a lower-level pixel scale may constitute an image block in an upper-level pixel scale. Therefore, a data storage structure may be set to an incremental storage manner in the cache. For example, using an image block as a basis, complete information of the image block is recorded in the cache, including a location in an image, a pixel value of the image block, and the like. For another image block, location increment information, pixel increment information, and the like relative to the basic image block are recorded.

Further, a specific implementation method of step 103 may include sending, to the client device using the remote desktop connection, information about an image block whose sending flag bit is sending allowed among the image blocks in each pixel scale.

Further, after querying the cache for the image blocks in the pixel scales in descending order, the server needs to send, to the client device using the remote desktop connection, only information about an image block whose sending flag bit is sending allowed, and may not send information about an image block whose sending flag bit is sending not allowed, or may send only increment information relative to a same image block that has been sent before. This is not limited herein.

A specific implementation method for the dividing an image according to at least two pixel scales, to obtain multiple image blocks in each pixel scale in step 101 and the determining a hash value of each image block in each pixel scale in step 102 may include the following steps.

Step a: The image is divided according to the minimum pixel scale of the at least two pixel scales, to obtain the multiple image blocks in the minimum pixel scale, and the hash value of each image block in the minimum pixel scale is determined according to a preset hash algorithm;

Step b: An image block in a first pixel scale is constituted by the image blocks that are vertically and/or horizontally adjacent;

Step c: The hash value of each image block in the first pixel scale is determined according to the preset hash algorithm; and Step d: Step b and step c are repeatedly performed, until the first pixel scale is larger than the maximum pixel scale of the at least two pixel scales.

Figure 2:
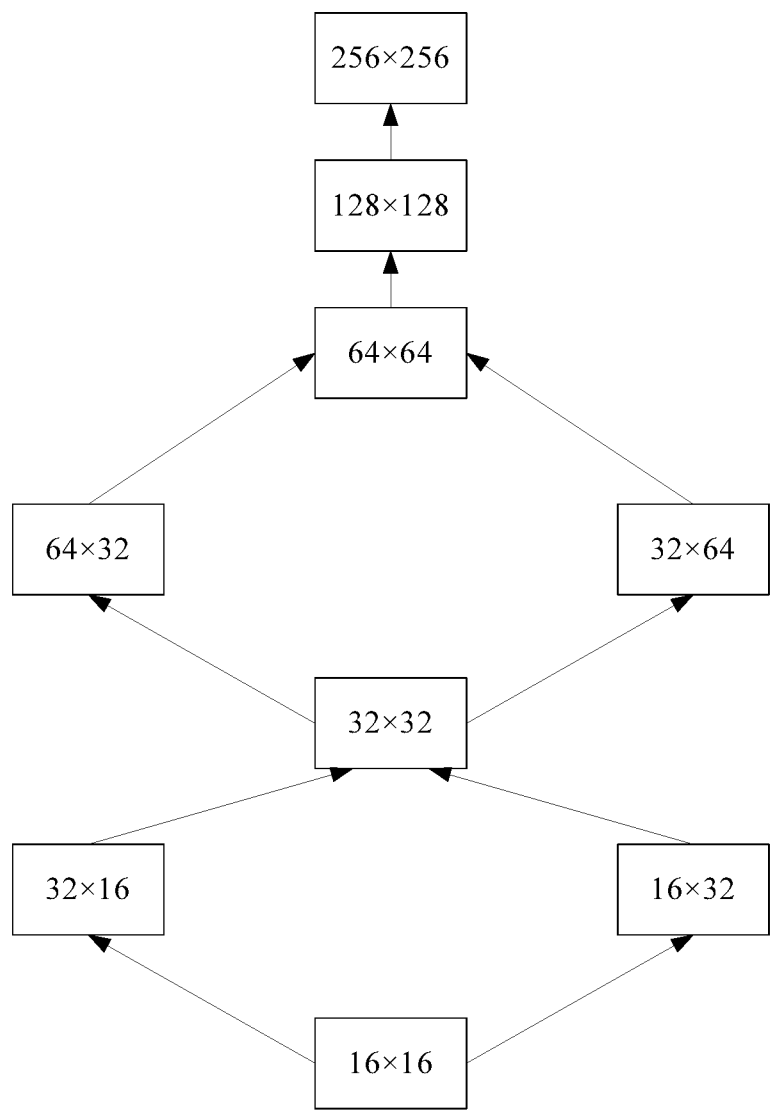
FIG. 2 is a schematic diagram of calculating a hash value of each image block in each pixel scale.

Using a specific example for description, FIG. 2 is a schematic diagram of calculating a hash value of each image block in each pixel scale. As shown in FIG. 2, a minimum pixel scale is 16×16, a maximum pixel scale is 256×256, and a first pixel scale includes 32×16, 16×32, 32×32, 64×32, 32×64, 64×64, 128×128, and 256×256. It may be learned that, there are a total of nine scales and seven levels in the example. The fourth level includes two pixel scales 64×32 and 32×64. The sixth level includes two pixel scales 32×16 and 16×32. An image is divided into 16×16 image blocks, and a hash value of each 16×16 image block is calculated according to the preset hash algorithm. Two vertically adjacent 16×16 image blocks constitute a 32×16 image block, and a hash value of each 32×16 image block is calculated according to the preset hash algorithm. Two horizontally adjacent 16×16 image blocks constitute a 16×32 image block, and a hash value of each 16×32 image block is calculated according to the preset hash algorithm. Similar to the foregoing steps, vertically adjacent 16×32 image blocks or horizontally adjacent 32×16 image blocks constitute a 32×32 image block, and a hash value of each 32×32 image block is calculated according to the preset hash algorithm. By analogy, lower-level image blocks constitute an upper-level image block, and a hash value of the upper-level image block is calculated according to the preset hash algorithm, until a hash value of each image block in a pixel scale at each node that is shown in FIG. 2 is calculated. The hash value of each image block in each pixel scale of the entire image may be obtained through calculation according to the forgoing process.

A specific implementation method for the querying a cache according to the hash value of each image block in each pixel scale in step 102 may include the following steps.

Step a: The cache is queried according to a hash value of each image block in a maximum pixel scale of the at least two pixel scales, an image block, in the maximum pixel scale, whose corresponding hash value is found in the cache is not further divided, and the step of setting a sending flag bit according to a query result is performed, and the following step b is performed for an image block, in the maximum pixel scale, whose corresponding hash value is not found in the cache;

Step b: An image block in a second pixel scale corresponding to the image block, in the maximum pixel scale, whose corresponding hash value is not found in the cache is obtained, the cache is queried according to a hash value of each image block in the second pixel scale, an image block, in the second pixel scale, whose corresponding hash value is found in the cache is not further divided, and the step of setting a sending flag bit according to a query result is performed, and step c is performed for an image block, in the second pixel scale, whose corresponding hash value is not found in the cache, where the second pixel scale is a pixel scale of the at least two pixel scales that is smaller than the maximum pixel scale; and Step c: An image block in a third pixel scale corresponding to the image block, in the second pixel scale, whose corresponding hash value is not found in the cache is obtained, the cache is queried according to a hash value of each image block in the third pixel scale, an image block, in the third pixel scale, whose corresponding hash value is found in the cache is not further divided, and the step of setting a sending flag bit according to a query result is performed, and an image block, in the third pixel scale, whose corresponding hash value is not found in the cache continues to be divided. The third pixel scale is a pixel scale of the at least two pixel scales that is smaller than the second pixel scale.

Figure 3:
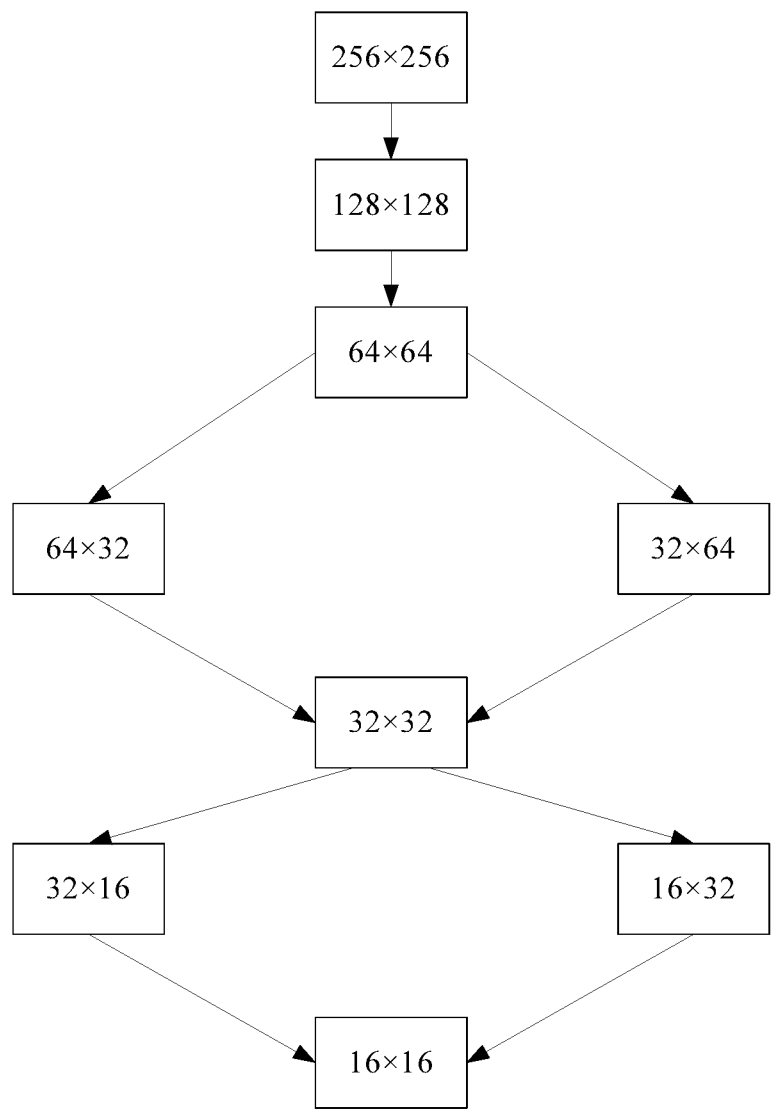
FIG. 3 is a schematic diagram of hash value matching of an image block.

Using a specific example for description, FIG. 3 is a schematic diagram of hash value matching of an image block. As shown in FIG. 3, query starts from a point (0,0) in screen coordinates in a depth-first traversal manner. That is, whether a hash value of each 256×256 image block is in the cache is first queried. If a hash value of a 256×256 image block is found in the cache, the server may not process the 256×256 image block for which matching is performed successfully, and may exit the query process. If a hash value of a 256×256 image block is not found in the cache, the server divides the 256×256 image block for which matching is not successfully performed into multiple 128×128 image blocks for query. Query is performed by analogy, until each image block in a 16×16 pixel scale is traversed. If a hash value that is the same as a hash value of a 16×16 image block is found, the server may not process the 16×16 image block for which matching is performed successfully, and may exit the query process. If a hash value that is the same as a hash value of a 16×16 image block is not found, the server does not process the 16×16 image block for which matching is not performed successfully, either, and exits the query process.

Further, the minimum pixel scale is 16×16, and the maximum pixel scale is 256×256. The first pixel scale includes 32×16, 16×32, 32×32, 64×32, 32×64, 64×64, 128×128, and 256×256. The second pixel scale includes 128×128, 64×64, 64×32, 32×64, 32×32, 32×16, 16×32, and 16×16.

Further, an image block in the foregoing minimum scale 16×16 may further continue to be divided into 16×8 image blocks, 8×16 image blocks, or 8×8 image blocks. A 64×32 image block may be divided into 32×32 image blocks, or may be divided into 16×64 image blocks or 64×16 image blocks.

Hence, the minimum pixel scale is 8×8, and the maximum pixel scale is 256×256. The first pixel scale includes 16×8, 8×16, 16×16, 32×16, 16×32, 32×32, 64×32, 32×64, 64×64, 128×128, and 256×256. The second pixel scale includes 128×128, 64×64, 64×32, 32×64, 32×32, 32×16, 16×32, 16×16, 16×8, 8×16, and 8×8.

Figure 4:
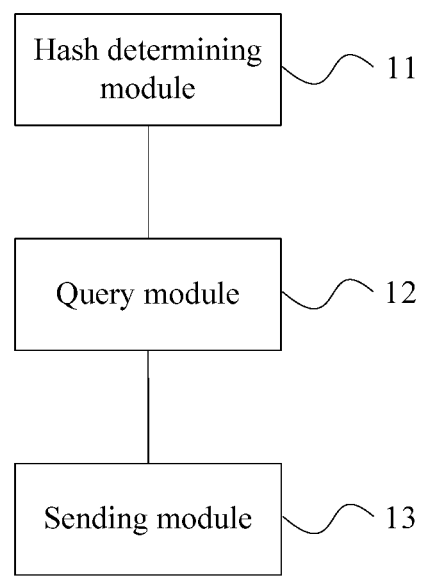
FIG. 4 is a schematic structural diagram of an embodiment of a serving end apparatus according to the present disclosure.

FIG. 4 is a schematic structural diagram of an embodiment of a serving end apparatus according to the present disclosure. As shown in FIG. 4, the apparatus in this embodiment is applied to a system in which a client apparatus establishes a remote desktop connection to the serving end apparatus. The apparatus may include a hash determining module 11, a query module 12, and a sending module 13. The hash determining module 11 is configured to divide an image according to at least two pixel scales, to obtain multiple image blocks in each pixel scale, and determine a hash value of each image block in each pixel scale. The query module 12 is configured to query a cache according to the hash value of each image block in each pixel scale, and set a sending flag bit of each image block in each pixel scale according to a query result. The sending module 13 is configured to send, according to the sending flag bit of each image block in each pixel scale, information about the image block to the client apparatus using the remote desktop connection.

The apparatus in this embodiment may be configured to implement the technical solution in the method embodiment shown in any one of FIG. 1 to FIG. 3. Implementation principles and technical effects thereof are similar, and details are not further described herein.

The query module 12 is further configured to set a sending flag bit of the first image block to sending not allowed if a hash value of a first image block in each pixel scale is found in the cache, and a status, in the cache, corresponding to the hash value of the first image block is sent, identify, in the cache, the status corresponding to the hash value of the second image block as sent, and set a sending flag bit of the second image block to sending allowed if a hash value of a second image block in each pixel scale is found in the cache, and a status, in the cache, corresponding to the hash value of the second image block is unsent, save the hash value of the third image block in the cache, identify, in the cache, a status corresponding to the hash value of the third image block as unsent, and set a sending flag bit of the third image block to sending not allowed if a hash value of a third image block in each pixel scale is not found in the cache, and a pixel scale of the third image block is not a minimum pixel scale of the at least two pixel scales, and save the hash value of the fourth image block in the cache, identify, in the cache, a status corresponding to the hash value of the fourth image block as sent, and set a sending flag bit of the fourth image block to sending allowed if a hash value of a fourth image block in each pixel scale is not found in the cache, and a pixel scale of the fourth image block is the minimum pixel scale of the at least two pixel scales.

The sending module 13 is further configured to send, to the client device using the remote desktop connection, information about an image block whose sending flag bit is sending allowed among the image blocks in each pixel scale.

The hash determining module 11 is further configured to perform the following steps.

Step a: Divide the image according to the minimum pixel scale of the at least two pixel scales, to obtain the multiple image blocks in the minimum pixel scale, and determine the hash value of each image block in the minimum pixel scale according to a preset hash algorithm;

Step b: Constitute an image block in a first pixel scale by the image blocks that are vertically and/or horizontally adjacent;

Step c: Determine the hash value of each image block in the first pixel scale according to the preset hash algorithm;

Step d: Repeatedly perform step b and step c, until the first pixel scale is larger than a maximum pixel scale of the at least two pixel scales.

The query module 12 is further configured to perform the following steps.

Step a: Query the cache according to a hash value of each image block in the maximum pixel scale of the at least two pixel scales, skip dividing an image block, in the maximum pixel scale, whose corresponding hash value is found in the cache, and perform the step of setting a sending flag bit according to a query result, and perform the following step b for an image block, in the maximum pixel scale, whose corresponding hash value is not found in the cache;

Step b: Obtain an image block in a second pixel scale corresponding to the image block, in the maximum pixel scale, whose corresponding hash value is not found in the cache, query the cache according to a hash value of each image block in the second pixel scale, skip dividing an image block, in the second pixel scale, whose corresponding hash value is found in the cache, and perform the step of setting a sending flag bit according to a query result, and perform step c for an image block, in the second pixel scale, whose corresponding hash value is not found in the cache, where the second pixel scale is a pixel scale of the at least two pixel scales that is smaller than the maximum pixel scale; and Step c: Obtain an image block in a third pixel scale corresponding to the image block, in the second pixel scale, whose corresponding hash value is not found in the cache, query the cache according to a hash value of each image block in the third pixel scale, skip dividing an image block, in the third pixel scale, whose corresponding hash value is found in the cache, and perform the step of setting a sending flag bit according to a query result, and continue to divide an image block, in the third pixel scale, whose corresponding hash value is not found in the cache, where the third pixel scale is a pixel scale of the at least two pixel scales that is smaller than the second pixel scale.

Persons of ordinary skill in the art may understand that all or some of the steps of the method embodiments may be implemented by a program instructing relevant hardware. The program may be saved in a computer-readable storage medium. The steps of the method embodiments are performed when the program runs. The foregoing storage medium includes any medium that can save program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An image transmission method, applied to a system in which a client device establishes a remote desktop connection to a server, comprising:
    dividing an image according to at least two pixel scales in order to obtain a plurality of image blocks in each pixel scale of the at least two pixel scales;
    determining a hash value of each image block in each pixel scale;
    querying a cache according to the hash value of each image block in each pixel scale;
    setting a sending flag bit of each image block in each pixel scale according to a query result; and
    sending, according to the sending flag bit of each image block in each pixel scale, information about an image block to the client device using the remote desktop connection.

2. The method according to claim 1, wherein setting the sending flag bit of each image block in each pixel scale comprises:
    setting a sending flag bit of a first image block to sending not allowed when a hash value of the first image block in each pixel scale is found in the cache, and a status, in the cache, corresponding to the hash value of the first image block is sent;
    identifying, in the cache, a status corresponding to a hash value of a second image block as sent, and setting a sending flag bit of the second image block to sending allowed when the hash value of the second image block in each pixel scale is found in the cache, and the status, in the cache, corresponding to the hash value of the second image block is unsent;
    saving a hash value of a third image block in the cache, identifying, in the cache, a status corresponding to the hash value of the third image block as unsent, and setting a sending flag bit of the third image block to sending not allowed when the hash value of the third image block in each pixel scale is not found in the cache, and a pixel scale of the third image block is not a minimum pixel scale of the at least two pixel scales; and
    saving a hash value of a fourth image block in the cache, identifying, in the cache, a status corresponding to the hash value of the fourth image block as sent, and setting a sending flag bit of the fourth image block to sending allowed when the hash value of the fourth image block in each pixel scale is not found in the cache, and a pixel scale of the fourth image block is the minimum pixel scale of the at least two pixel scales.

3. The method according to claim 1, wherein sending the information about the image block to the client device comprises sending, to the client device using the remote desktop connection, information about an image block whose sending flag bit is sending allowed among the plurality of image blocks in each pixel scale.

4. The method according to claim 1, wherein querying the cache according to the hash value of each image block in each pixel scale comprises the following steps:

(a) querying the cache according to a hash value of each image block in a maximum pixel scale of the at least two pixel scales, skipping dividing an image block in the maximum pixel scale, whose corresponding hash value is found in the cache, setting the sending flag bit according to the query result, and performing step (b) for an image block in the maximum pixel scale, whose corresponding hash value is not found in the cache;

(b) obtaining an image block in a second pixel scale corresponding to the image block in the maximum pixel scale, whose corresponding hash value is not found in the cache, querying the cache according to a hash value of each image block in the second pixel scale, skipping dividing an image block in the second pixel scale, whose corresponding hash value is found in the cache, setting the sending flag bit according to the query result, and performing step (c) for an image block in the second pixel scale, whose corresponding hash value is not found in the cache, wherein the second pixel scale is a pixel scale of the at least two pixel scales and smaller than the maximum pixel scale; and (c) obtaining an image block in a third pixel scale corresponding to the image block in the second pixel scale, whose corresponding hash value is not found in the cache, querying the cache according to a hash value of each image block in the third pixel scale, skipping dividing an image block in the third pixel scale, whose corresponding hash value is found in the cache, setting the sending flag bit according to the query result, and continuing to divide an image block in the third pixel scale, whose corresponding hash value is not found in the cache, wherein the third pixel scale is a pixel scale of the at least two pixel scales and smaller than the second pixel scale.

5. A serving end apparatus, applied to a system in which a client apparatus establishes a remote desktop connection to the serving end apparatus, comprising:

a memory comprising a plurality of instructions; and a processor coupled to the memory, wherein the plurality of instructions cause the processor to be configured to:

divide an image according to at least two pixel scales, to obtain a plurality of image blocks in each pixel scale;

determine a hash value of each image block in each pixel scale of the at least two pixel scales;

query a cache according to the hash value of each image block in each pixel scale;

set a sending flag bit of each image block in each pixel scale according to a query result; and send, according to the sending flag bit of each image block in each pixel scale, information about an image block to the client apparatus using the remote desktop connection.

6. The serving end apparatus according to claim 5, wherein the plurality of instructions further cause the processor to:

set a sending flag bit of a first image block to sending not allowed when a hash value of the first image block in each pixel scale is found in the cache, and a status, in the cache, corresponding to the hash value of the first image block is sent;

identify, in the cache, a status corresponding to a hash value of a second image block as sent, and set a sending flag bit of the second image block to sending allowed when the hash value of the second image block in each pixel scale is found in the cache, and the status, in the cache, corresponding to the hash value of the second image block is unsent;

save a hash value of a third image block in the cache, identify, in the cache, a status corresponding to the hash value of the third image block as unsent, and set a sending flag bit of the third image block to sending not allowed when the hash value of the third image block in each pixel scale is not found in the cache, and a pixel scale of the third image block is not a minimum pixel scale of the at least two pixel scales; and save a hash value of a fourth image block in the cache, identify, in the cache, a status corresponding to the hash value of the fourth image block as sent, and set a sending flag bit of the fourth image block to sending allowed when the hash value of the fourth image block in each pixel scale is not found in the cache, and a pixel scale of the fourth image block is the minimum pixel scale of the at least two pixel scales.

7. The serving end apparatus according to claim 5, wherein the plurality of instructions further cause the processor to send, to the client apparatus using the remote desktop connection, information about an image block whose sending flag bit is sending allowed among the plurality of image blocks in each pixel scale.

8. The serving end apparatus according to claim 5, wherein the plurality of instructions further cause the processor to perform the following steps:

(a) query the cache according to a hash value of each image block in a maximum pixel scale of the at least two pixel scales, skip dividing an image block in the maximum pixel scale, whose corresponding hash value is found in the cache, set the sending flag bit according to the query result, and perform step (b) for an image block in the maximum pixel scale, whose corresponding hash value is not found in the cache;

(b) obtain an image block in a second pixel scale corresponding to the image block in the maximum pixel scale, whose corresponding hash value is not found in the cache, query the cache according to a hash value of each image block in the second pixel scale, skip dividing an image block in the second pixel scale, whose corresponding hash value is found in the cache, set the sending flag bit according to the query result, and perform step (c) for an image block in the second pixel scale, whose corresponding hash value is not found in the cache, wherein the second pixel scale is a pixel scale of the at least two pixel scales and smaller than the maximum pixel scale; and (c) obtain an image block in a third pixel scale corresponding to the image block in the second pixel scale, whose corresponding hash value is not found in the cache, query the cache according to a hash value of each image block in the third pixel scale, skip dividing an image block in the third pixel scale, whose corresponding hash value is found in the cache, set the sending flag bit according to the query result, and continue to divide an image block in the third pixel scale, whose corresponding hash value is not found in the cache, wherein the third pixel scale is a pixel scale of the at least two pixel scales and smaller than the second pixel scale.

9. A computer program product, stored on non-transitory computer readable medium, the product comprising instructions operable to cause a computer system to perform a method for image transmission, the method comprising:

dividing an image according to at least two pixel scales in order to obtain a plurality of image blocks in each pixel scale of the at least two pixel scales;

determining a hash value of each image block in each pixel scale;

querying a cache according to the hash value of each image block in each pixel scale;

setting a sending flag bit of each image block in each pixel scale according to a query result; and sending, according to the sending flag bit of each image block in each pixel scale, information about an image block to the client device using the remote desktop connection.

10. The computer program product of claim 9, wherein setting the sending flag bit of each image block in each pixel scale comprises:

setting a sending flag bit of a first image block to sending not allowed when a hash value of the first image block in each pixel scale is found in the cache, and a status, in the cache, corresponding to the hash value of the first image block is sent;

identifying, in the cache, a status corresponding to a hash value of a second image block as sent, and setting a sending flag bit of the second image block to sending allowed when the hash value of the second image block in each pixel scale is found in the cache, and the status, in the cache, corresponding to the hash value of the second image block is unsent;

saving a hash value of a third image block in the cache, identifying, in the cache, a status corresponding to the hash value of the third image block as unsent, and setting a sending flag bit of the third image block to sending not allowed when the hash value of the third image block in each pixel scale is not found in the cache, and a pixel scale of the third image block is not a minimum pixel scale of the at least two pixel scales; and saving a hash value of a fourth image block in the cache, identifying, in the cache, a status corresponding to the hash value of the fourth image block as sent, and setting a sending flag bit of the fourth image block to sending allowed when the hash value of the fourth image block in each pixel scale is not found in the cache, and a pixel scale of the fourth image block is the minimum pixel scale of the at least two pixel scales.

11. The computer program product of claim 9, wherein sending the information about the image block to the client device comprises sending, to the client device using the remote desktop connection, information about an image block whose sending flag bit is sending allowed among the plurality of image blocks in each pixel scale.

12. The computer program product of claim 9, wherein querying the cache according to the hash value of each image block in each pixel scale comprises the following steps:

(a) querying the cache according to a hash value of each image block in a maximum pixel scale of the at least two pixel scales, skipping dividing an image block in the maximum pixel scale, whose corresponding hash value is found in the cache, setting the sending flag bit according to the query result, and performing step (b) for an image block in the maximum pixel scale, whose corresponding hash value is not found in the cache;

(b) obtaining an image block in a second pixel scale corresponding to the image block in the maximum pixel scale, whose corresponding hash value is not found in the cache, querying the cache according to a hash value of each image block in the second pixel scale, skipping dividing an image block in the second pixel scale, whose corresponding hash value is found in the cache, setting the sending flag bit according to the query result, and performing step (c) for an image block in the second pixel scale, whose corresponding hash value is not found in the cache, wherein the second pixel scale is a pixel scale of the at least two pixel scales and smaller than the maximum pixel scale; and (c) obtaining an image block in a third pixel scale corresponding to the image block in the second pixel scale, whose corresponding hash value is not found in the cache, querying the cache according to a hash value of each image block in the third pixel scale, skipping dividing an image block in the third pixel scale, whose corresponding hash value is found in the cache, setting the sending flag bit according to the query result, and continuing to divide an image block in the third pixel scale, whose corresponding hash value is not found in the cache, wherein the third pixel scale is a pixel scale of the at least two pixel scales and smaller than the second pixel scale.

\* \* \* \* \*